United States Patent [19]

Charpentier

[11] 3,863,908
[45] Feb. 4, 1975

[54] CELLULAR, RESINOUS PRODUCTS AND METHODS AND APPARATUS FOR MAKING THEM

[75] Inventor: Maurice Charpentier, Rantigny, France

[73] Assignee: Saint-Gobain, Nurilly-sur-Seine, France

[22] Filed: Jan. 1, 1971

[21] Appl. No.: 105,661

Related U.S. Application Data

[63] Continuation of Ser. No. 681,515, Nov. 8, 1967, abandoned.

[30] Foreign Application Priority Data

Apr. 15, 1965 France ............................. 65.13377
Nov. 10, 1966 France ............................. 66.83268

[52] U.S. Cl. ............... 264/45.5 A, 264/48, 264/51, 264/109, 264/321, 264/DIG. 14, 264/46.2
[51] Int. Cl. ...................... B29d 27/00, B29d 27/08
[58] Field of Search .......... 264/47, 51, 53, 48, 321, 264/109, DIG. 14

[56] References Cited
UNITED STATES PATENTS

| | | |
|---|---|---|
| 2,767,436 | 10/1956 | Noland ............................. 264/321 |
| 2,898,632 | 8/1959 | Irwin et al. ..................... 264/DIG. 14 |
| 2,962,407 | 11/1960 | Aykanian ......................... 264/47 X |
| 3,065,500 | 11/1962 | Berner ............................. 264/53 X |
| 3,170,974 | 2/1965 | Jacobs ............................. 264/321 X |
| 3,243,484 | 3/1966 | Immel ............................. 264/48 |
| 3,255,286 | 6/1966 | Luc-Belmont .................... 264/51 X |
| 3,301,935 | 1/1967 | Stoeckhert ....................... 264/321 |
| 3,312,760 | 4/1967 | Berner ............................. 264/51 |
| 3,359,353 | 12/1967 | Oddi ................................. 264/53 |
| 3,368,009 | 2/1968 | Oddi ................................. 264/321 X |
| 3,383,441 | 5/1968 | Norrhede ......................... 264/51 |
| 3,426,111 | 2/1969 | Simpson ........................... 264/48 |
| 3,427,372 | 2/1969 | Berner ............................. 264/51 |

*Primary Examiner*—Philip E. Anderson
*Attorney, Agent, or Firm*—Robert W. Boyle; John T. Synnestvedt

[57] ABSTRACT

Polystyrene objects, notably stiff sheets, are made with different surfaces, with cross sections of differing density, with or without coatings of pellicular or cementitious nature, are made by a thermal process on continuously operable machines which are readily controlled to produce modifications in the product. A new product, expanded polystyrene pearls, is a preferred raw material, as the method of expanding it can be worked into and form a part of the process.

8 Claims, 4 Drawing Figures

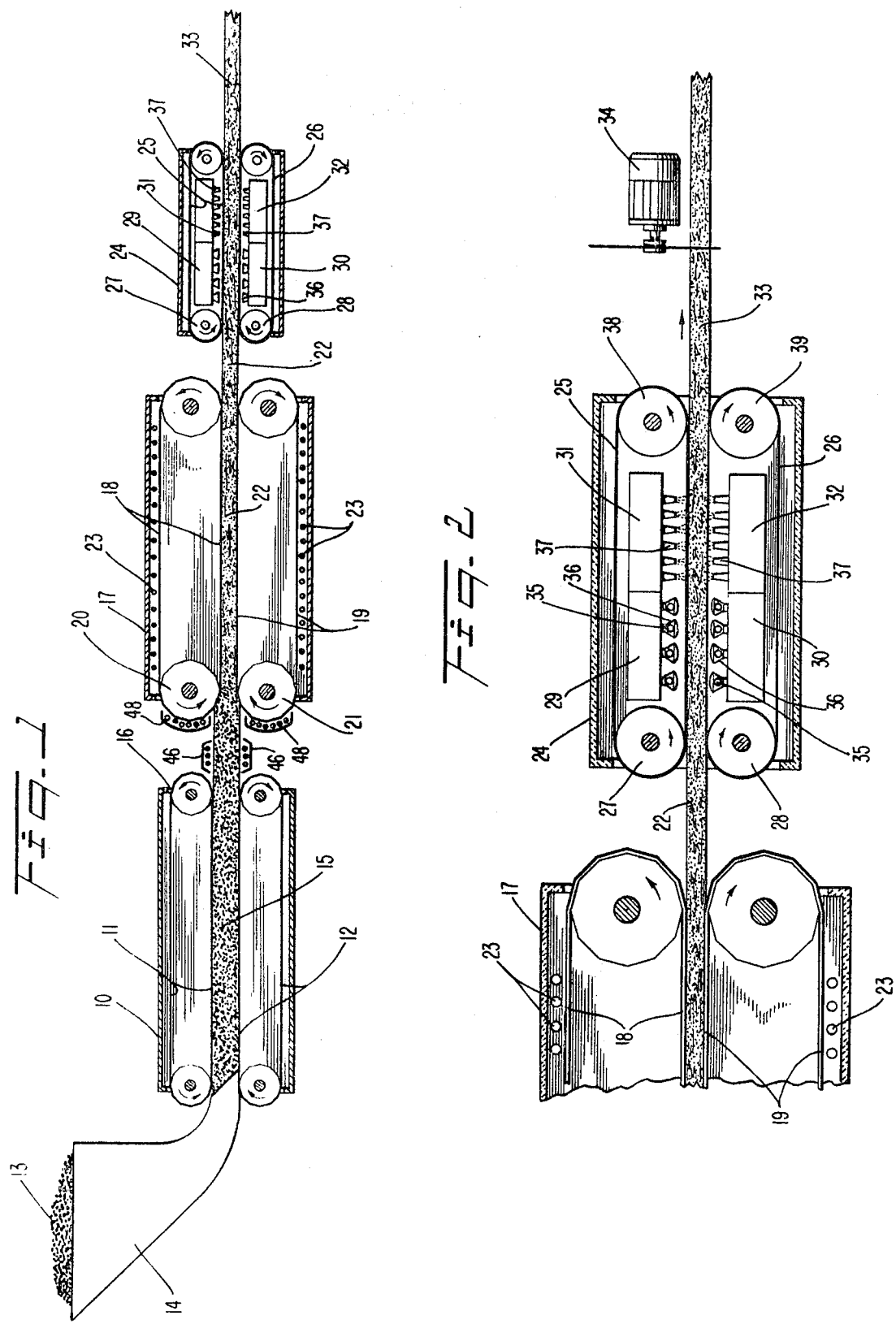

CELLULAR, RESINOUS PRODUCTS AND METHODS AND APPARATUS FOR MAKING THEM

This application is a continuation of application Ser. No. 681,515 filed Nov. 8, 1967 and now abandoned.

This invention is an improvement in product, process, and apparatus over my invention as described in U.S. application Ser. No. 542,367, filed Apr. 13, 1966, entitled "Fabrication of Cellular Resinous Products."

In the invention of which this is an improvement bodies of cellular synthetic resin are prepared from (as preferred raw material) pearls of expanded polystyrene. Expanded polystyrene is a new product which is made by heating pearls of polystyrene until they are fully expanded and contain no residual, unexpanded blowing agent.

The present invention is applicable to cellular materials of many kinds of thermoplastic resin but because of the superiority of expanded polystyrene pearls the invention will be described as to them as a preferred example.

Expanded polystyrene pearls are used, in the former case, in a first step by reheating them to their softening temperature, in a second step compressing them to form a body of definitive shape, the pearls of which are autogenously united, and in a third step cooling material under compression sufficient to maintain its dimensions until the resin is set. That specification also describes an apparatus for the continuous production of a sheet composed of compressed pearls of polystyrene, involving a first thermal treatment between two carrier belts through which hot air passes and a second thermal treatment between carrier belts which maintain the pearls at softening temperature, compress them to the definitive size of the product, and cool them in their final shape. The body produced by that apparatus is a sheet of uniform thickness, substantial strength, substantially uniform density, from face to face, and high insulating value, useful in fireproofing, as insulation, and for many uses in the building trades.

It is an object of this invention to provide such objects and such sheeting with improved strength, improved resistance to penetration, improved internal constitution and different types of finish. Other objects of the invention are to accomplish the foregoing objects thermally by a process having great flexibility of control, and by novel effective and efficient apparatus.

The novel process may begin with the use of expanded polystyrene from stock or the process of expansion may be made a part of the continuous process. When the polystyrene pearls are made as part of the process they will be expanded as a flow stream at a rate which will provide the novel apparatus continuously with its raw material, the temperature of the pearls being carried high enough to vaporize all blowing agent and to fully expand the pearls under its internal pressure, the hot pearls, at softening temperature, then being delivered to the first pair of conveyors which form the incipient sheet, not yet at its final dimensions. When the expanded pearls are taken from stock they will first be reheated to softening temperature and then delivered to the conveyors which shape the incipient sheet. This will be understood by reference to the drawings.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic elevational view, partly in section, illustrating the present process and apparatus;

FIG. 2 is an enlarged view in similar partial section illustrating the apparatus for applying different surfaces and different internal constructions to the new product;

Figure 3:
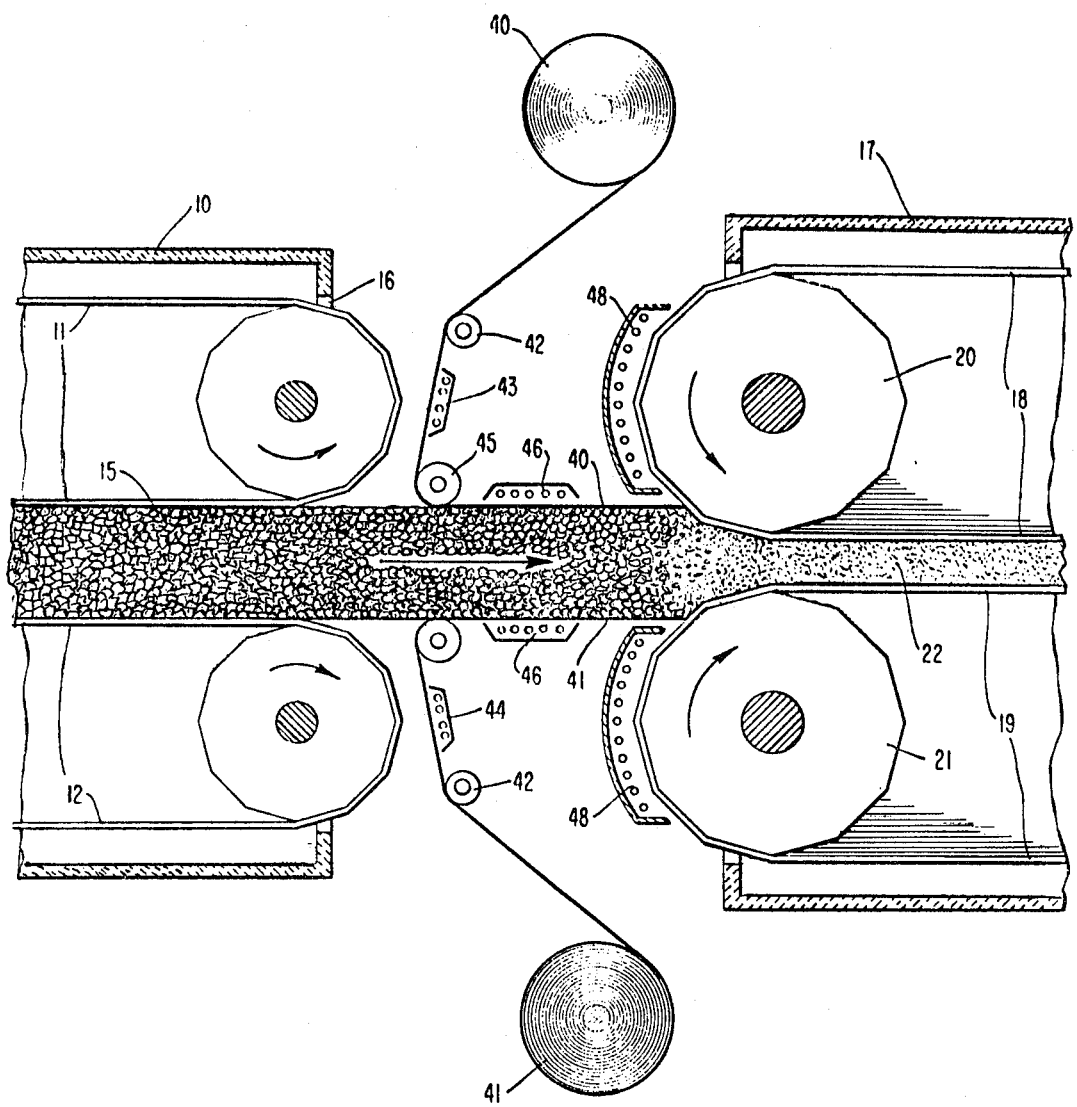
FIG. 3 is a vertical elevational view yet further enlarged illustrating the application of sealing and strengthening means to the product by autogenous attachment.

Referring now to FIG. 1, a thermal tunnel 10 is provided with an upper carrier belt 11 and a lower carrier belt 12 between the opposed courses of which a supply of polystyrene pearls 13 is received from a hopper 14. These carrier belts form an incipient sheet 15 and, as the pearls are at their softening temperature, they are autogenously welded together at their points of contact. The body is still porous and it is possible to maintain it at chosen temperature by flowing hot air vertically through it. As the incipient sheet forms it is moved between conveyors to the discharge port 16 of the tunnel, passing thence across a space between the tunnel 10 and a similar tunnel 17 which also contains an upper carrier belt 18 and a lower 19. In each case the carrier belts are carried on rollers which are numbered 20, 21. In tunnel 17 these rollers, aided by retaining baffles (not shown) at their ends compress the incipient sheet 15 to its definitive dimensions 22. The upstream end of tunnel 17 may be heated as desired but the downstream end is cooled in any convenient way, for instance by coolers 23, of pneumatic type which deliver a sufficient flow of cool air to solidify the sheet 22 in its definitive dimensions. At this point the sheet is similar to that which is made by the prior invention having uniform density and a rough surface in which the carrier belts 18, 19 will have left marks. The product at this point also is of substantially uniform density from face to face.

One of the objects of this invention is to provide a cellular sheet with a different surface aspect and this is accomplished in the thermal tunnel 24 which is provided with upper and lower carrier belts 25, 26 which do not apply any substantial pressure to the incoming sheet 22 which, having been cooled throughout at the downstream end of tunnel 17 to a temperature below its softening point, is not affected dimensionally by the trivial pressure applied by the rollers 27, 28. At the upstream end of the tunnel 24 are infrared heaters 29, 30 which are sufficient in number and intensity to heat the surfaces of sheet 22 above the softening point to a temperature at which their surface tension tends to provide a smooth surface. This tendency is assisted by pneumatic jets 31, 32 which are directed upon hot and fluid surfaces and tend further to smooth them while cooling them below the softening point. The duration and intensity of this heating is not sufficient to soften the core of the sheet and as a consequence the sheet 33 issues in its definitive form with surfaces which are smooth and may be of polished aspect. In the improvement thus far described only the surfaces of the sheet are softened and changed.

It is sometimes desirable to change the appearance of only one face of the sheet, in which case the heaters 29 will be employed and heaters 30 will not.

In FIG. 2 is diagrammatically shown the novel apparatus as in FIG. 1 for the posttreatment of the definitive sheet 22 after it issues from the thermal tunnel 17. It involves a thermal tunnel 24 which may be temperature controlled by any method to maintain the internal temperature within a satisfactory range, and including an initial section 29-30 equipped with a series of infrared heating means 35, set within reflectors 36 which direct their rays onto each respective adjacent side of sheet 22. These heaters can be used all together or in whatever combinations are desired, for instance using both heating units, or only one heating unit, and, in each heating unit, using as few or as many of the heater units as are required for a particular operation. Thus, the surface of one or both sides of the sheet may be softened and the depth of heating may be controlled in each instance by the number of lights in operation. As part of the inner thermal tunnel are the blowers 31, 32, which are directed over the entire upper and lower surfaces of the sheet, a series of jets 37 which are arranged in patterns which uniformly treat the softened surfaces of the sheet. These jets may also be individually controlled to reduce or increase the number in operation and to reduce or increase their velocity. These jets may be all at one temperature or at progressively decreasing temperature so that the upstream jets may maintain the softness of the surfaces while the smoothing progresses and the downstream jets may be made progressively colder to harden the surfaces before they engage the downstream rollers 38,39, preventing surface marking by the rollers which support the cutter 34 of any convenient construction.

By this construction the surface of the cellular sheet may be provided with appearances from rough to smooth under conditions of complete control and the depth affected by the treatment may be altered from the purely superficial to a considerable penetration of the outer layers of pearls.

The belt carriers used in the apparatus may vary in composition from fourdrinier type similar to that used in paper making, to leather, to various kinds of fabric.

Figure 4:
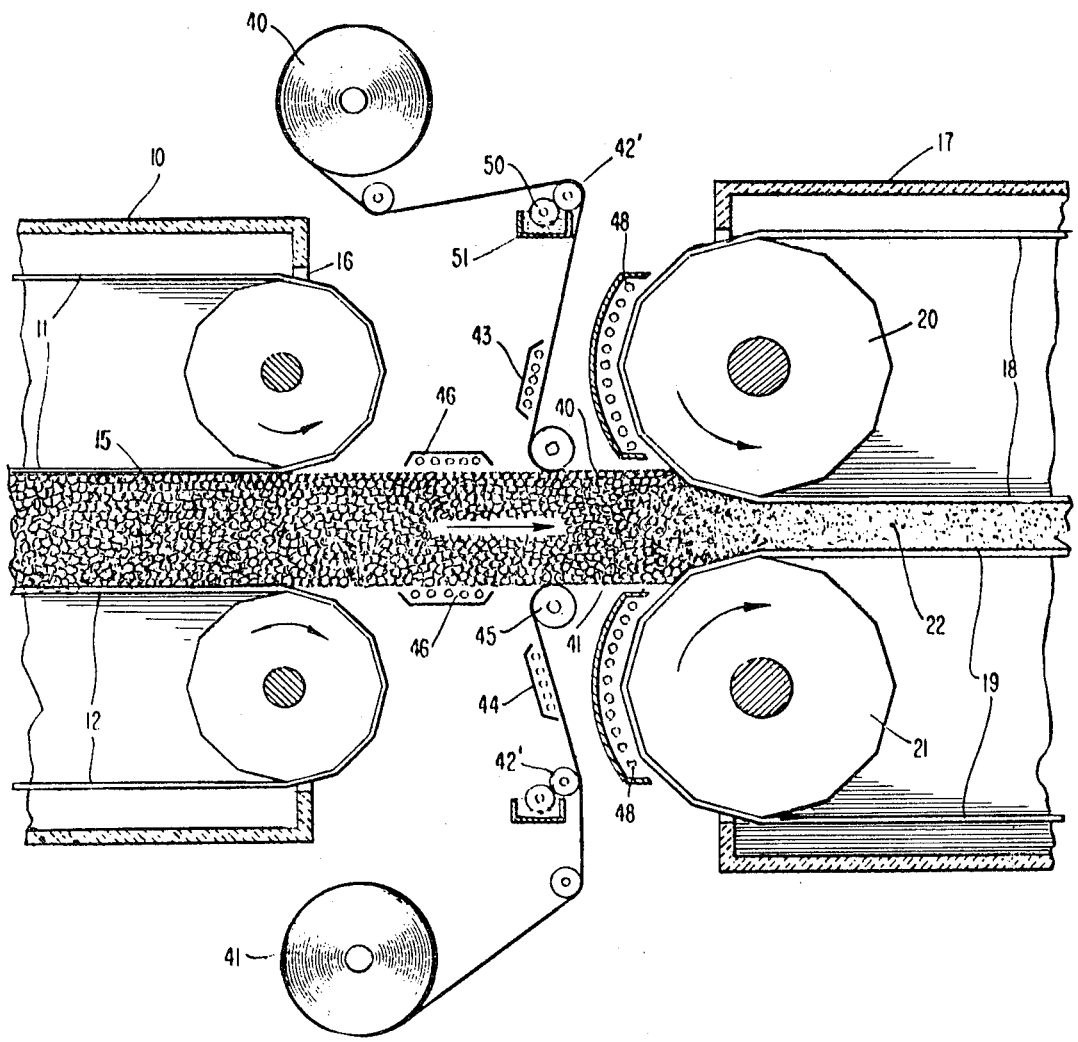
FIG. 4 is a vertical elevation partly in section diagrammatic in nature illustrating the application of coating means of pellicular type to the novel product by adhesive.

It is sometimes desirable to apply a strengthening, or an impervious coat, to one or both sides of the cellular sheet. Apparatus for accomplishing this is shown in FIGS. 3 and 4, of which FIG. 3 is devoted to autogenous welding and FIG. 4 is directed to attachment by adhesive. Thus, all useful covering sheets may be successfully attached to the cellular sheet. According to FIG. 3 the incipient sheet 15, issuing from opening 16 of thermal tunnel 10 passes between rolls 40, 41 of thermoplastic covering sheets such, for example, as polyethylene or polyvinyl chloride. As the covering sheet unrolls from roll 40 it passes over idler roller 42 past infrared heater 43, which raises its temperature to its softening point or to the temperature at which it becomes adhesive, from whence it passes to roller 45 which applies it to the surface of incipient sheet 15. When the speed of the covering sheet and its heat retention are adequate, this is sufficient to cause autogenous welding of the covering sheets to the incipient sheet, but in other cases a heater 46, also conveniently of infrared type, will supply whatever additional heat is necessary to render the covering sheets adhesive and to render the surface of incipient sheet 15 equally so. The incipient sheet with covering sheets attached then proceeds between rollers 20, 21 which compress it to its definitive size 22. These rollers, by applying pressure, increase the strength of the bond. It is also possible for them to perform other functions. For example, heaters 48, directed upon the arcs of the belts (which in this instance must have adequate heat resistance), raise the belts, and possibly the contiguous part of the rollers, to a higher degree than the temperature of the incipient sheet. When this temperature is indeed higher the layers of pearls adjacent the hotter conveyors and rollers will be made more plastic than the core of the sheet and will be compressed to a higher degree creating skins of different density, the thickness of which will be related to the temperature differential between the core and the compressing surfaces. This phase of the invention can also be employed on one or both sides of the cellular sheet and with the same or different intensities to provide the opposite sides of the sheet with skins of different density and thickness. It is to be understood that this particular function, of providing the sheet 22 with skins of different thickness or density, is useful in the absence of the covering sheets 40, 41 and also when these covering sheets are present.

In FIG. 4 is illustrated a modification of FIG. 3 designed to apply covering sheets such as paper, asbestos and thermoplastic materials, which are not normally adherent to polystyrene, to the cellular sheet by means of adhesive. In this figure coating rollers 40 dip into liquid adhesive 51 in accordance with known principles and transfer a layer of adhesive to roller 42' which, in turn, transfers it to one face of the covering sheets.

It will be apparent that according to a characteristic of the invention one or both of the faces of the cellular sheet issuing from the first thermal tunnel is heated to give it the surface finish and appearance desired. This is accomplished by variable heating and produces on the band a surface more or less rough or more or less smooth, as desired. It is also possible to provide the cellular sheet with skins of selected depth below the surfaces, and of different density. Further, although it is not illustrated in the drawings it is possible to coat the cellular sheet with plaster or cement by a process which is illustrated and claimed in a copending application. In a third series of cases it is desirable to cover one or both surfaces of the sheet with a covering sheet to seal the surfaces, to add strength, or to add protection against atmospheres or chemicals of particular natures.

Although heating by infrared is preferred other means of heating can be substituted in some cases. When infrared is used the power employed in them may be controlled for a given installation as a function of the speed of the cellular sheet and the appearance which is desired. In general heating is moderate if one wishes to obtain surfaces which are rough and more intense if one wishes to produce smooth surfaces.

According to another characteristic of the invention the upstream part of the elements which compress the cellular sheet are heated to a temperature to make a skin having a density notably superior to that of the core. For example, the temperature of the surfaces of the upstream compressors may vary from about 80° to 130°C., the thickness of the skin being in relation to the temperature, the higher temperatures producing thicker skins and the smoother surfaces and the lower temperatures the thinner skins and rougher surfaces. It will thus be observed that the control of the temperature of the compressing rollers can be made to contribute to the final appearance which is achieved in the tunnel 24.

It is an advantage of this invention that the apparatus is completely controllable and that some parts of it may be made inactive while other parts of it pursue their advantageous operations. Thus, in some instances the thermal tunnel 24 may be made inactive for instance when product 22 issuing from thermal tunnel 17 is satisfactory for an intended use.

The thermal tunnels have been illustrated as separate entities but they would equally well be enclosed within a single structure as chambers.

The establishment of denser skins at the surfaces increases chemical resistance and particularly resistance to penetration and bending. If both faces of the product are thus treated, the final product is very stiff and strong and has great resistance to flexing.

Among the covering sheets which are applied to the cellular sheet are plastic films, paper sheets, fiber glass fabrics and the like. It is of material interest under some circumstances to coat the cellular sheet with a covering sheet of the same polystyrene.

By adjusting the temperature of the thermoplastic covering sheet the effect of shrinking during cooling produces a surface layer which is perfectly level and without indentations.

When a sheet of cellular polystyrene is joined to a covering sheet of polystyrene the cellular sheet may satisfactorily be raised to a temperature of 100°–130°C. and the polystyrene covering sheet (film) may be raised to 110°–180°C., the actual temperatures in each instance being chosen as a function of the speed of the film.

When plaster or cement is to be applied to the cellular sheet it can be spread on by the usual spreaders and leveled by ordinary leveling means such as a doctor blade. This is as possible for the bottom of the cellular sheet as for the top. In general a support is provided below the belt which holds the cementitious material in contact with the belt until it is adherent and coherent, under appropriate conditions of temperature and pressure.

The following examples illustrates the invention:
Obtention of a smooth surface

The following schedule illustrate the various conditions of temperature and time of treatment, for different densities of the final product, when operating with the apparatus shown on FIG. 1.

is brought at a temperature of about 125°C. This film is applied at a speed of 1.80 meter p. minute equal to the speed of progression of the cellular material.

Example 2

Application of a polystyrene film.

A film of polystyrene of a thickness of 80 microns is brought at a temperature of 120°C. This film is applied at a speed of 1.80 meter p. minute as in example 1.
Application of a paper coating A paper of a weight of 90 g p. square meter is stuck on the cellular material with bitumen (weight : 175 g p. square meter) applied to said material at a temperature of 120°C about. The paper is applied at a speed of 3 meters p. second equal to the speed of the cellular material.
Application of a cementitious coating The surface of the cellular material is kept rough, the heating of the surface being reduced and no heating by infra-red-tubes or by heating elements in contact with the material being provided. A plaster sludge comprising Plaster —100
Water —80 is applied to the surface by all suitable means.

As many apparently widely different embodiments of the present invention may be made without departing from the spirit and scope thereof, it is to be understood that the invention is not limited to the specific embodiments.

What is claimed is:

1. The method of forming a cellular sheet from expanded polystyrene pearls which comprises introducing the pearls into the first of a series of tunnels defined by sheet shaping belt conveyors, heating the pearls to their softening temperature in an upstream tunnel without substantial compression until they are autogeneously welded together into a porous body by blowing hot gases through the pearls in said tunnel, continuing to blow hot gases through the body to maintain the temperature of the body, passing the body into a downstream tunnel while at the softening temperature and compressing it therein to its definitive dimensions, cooling the body under compression to solidify it, passing the body into a further downstream tunnel, and reheating at least one surface of the body above the softening temperature, without substantial compression and without raising the core of the body to the softening temperature, until the surface softens and becomes smooth, and cooling the body.

| Density of the final product | Temperature at the level of the material under treatment under infra-red-tubes | Temperature at the surface of the elements in contact with the material under treatment | Time of passage of the product in the infra-red heated zone | Time of compression by heated elements |
|---|---|---|---|---|
| 8 Kg/m³ | 125°C | 115°C | 1 to 2 sec. | 2 to 4 sec. |
| 12 and 15 Kg/m³ | do. | do. | 2 to 4 sec. | 4 to 8 sec. |
| 20 Kg/m³ | do. | do. | about 5 sec. | about 10 sec. |

Application of a polystyrene coating

Example 1

Application of a film of polystyrene.

A film of polystyrene of a thickness of 2 millimeters

2. The method of claim 1 which includes the added step of blowing jets of a gas upon the softened surface to aid in its final smoothing and polishing.

3. The method of claim 2 in which the jets of gas are in a series at progressively decreasing temperature.

4. The method of claim 1 in which a surface of the body, in leaving the tunnel without substantial compression, is heated to a temperature materially higher than its core by the application of more intense and brief heat, whereby the surface layers when compressed in the said downstream tunnel provide the body with a denser and stronger exterior layer.

5. The method of claim 4 in which the thickness of the denser layer is controlled by choosing a reheating temperature between 80° and 130°C. which produces a denser layer of the thickness desired.

6. The method of imparting distinctive appearance and dense strong surface layers to sheets of foamed polystyrene, comprising, continuously feeding discrete pearls of fully pre-expanded polystyrene between first and second superposed essentially parallel runs of foraminous belts moving at synchronous speed in order to fill the space defined thereby, while blowing heated gas therethrough, to thereby autogeneously weld the pearls into a porous, incipient sheet of initial thickness, compressing the hot incipient sheet to its definitive form and cooling it throughout below the softening temperature of the polystyrene, rapidly reheating at least one surface of the cooled sheet, to a temperature at which the surface layer of the sheet is softened and flattened by surface tension, while keeping the central internal layers of the sheet below the softening temperature of the polystyrene, and cooling the surface thus reheated while retaining the sheet under compression sufficient to maintain said final thickness.

7. The process of continuously producing a cellular insulating sheet having a surface selectively variable from rough to smooth, and a surface layer of selectively variable thickness and of density greater than the density of its subsurface layers, comprising continuously heating a moving mass of loose expanded polystyrene pearls to their softening temperature in order to cohere them into a porous body, shaping the porous body of heated pearls under pressure to thereby produce a moving, continuous cellular sheet of definitive shape, cooling the shaped article throughout to below softening temperature, thereafter reheating the surface layer of the sheet to a selected depth by passing it through the output of a series of radiant heaters, at a temperature in the range from about 80° to about 130°C., while leaving the subsurface layers of the sheet at a temperature below the softening temperature of the pearls, and cooling the completed sheet until it is hard.

8. In the method of claim 6 the step of heating the surface of the cooled sheet of definitive size by passing the sheet through a series of heaters until the surface is softened and directing jets of a gas at progressively decreasing temperatures against the softened surface whereby the surface is smoothed and hardened.

* * * * *